UNITED STATES PATENT OFFICE.

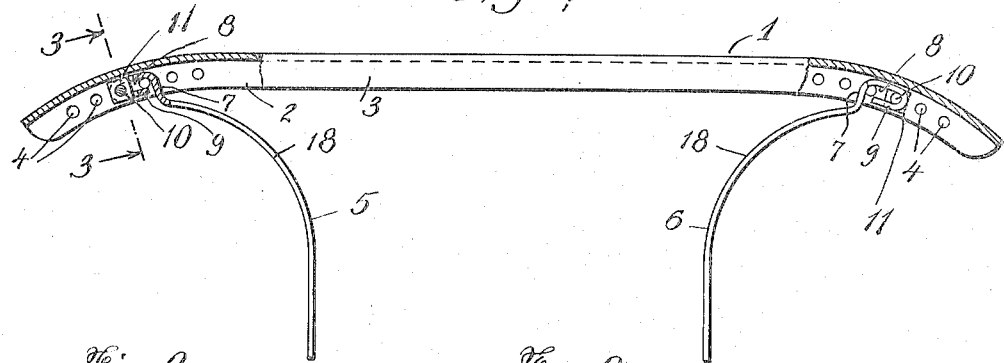
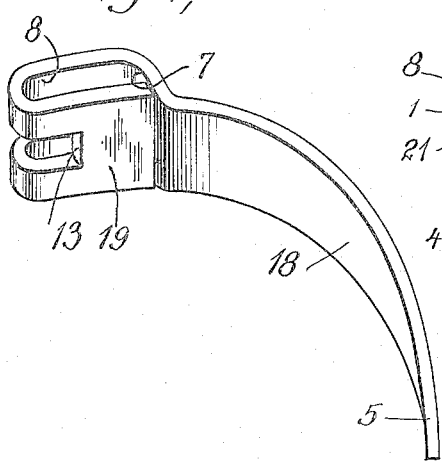
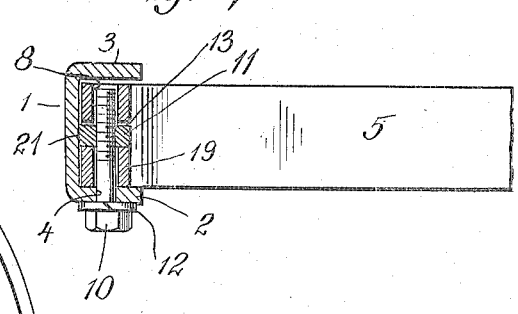
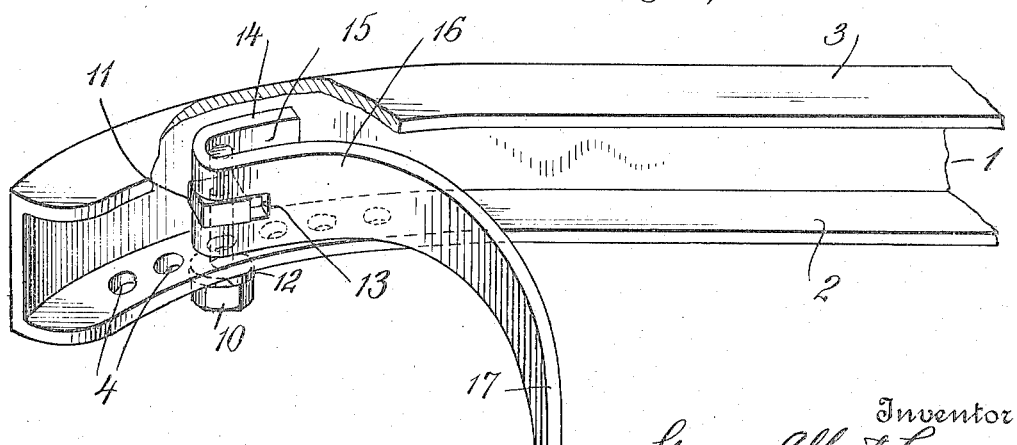

GEORGE ALBERT LYON, OF PHILADELPHIA, PENNSYLVANIA.

CHANNEL-BAR AUTOMOBILE-BUFFER.

1,325,734.  Specification of Letters Patent.  Patented Dec. 23, 1919.

Application filed February 7, 1918. Serial No. 215,762.

*To all whom it may concern:*

Be it known that I, GEORGE ALBERT LYON, a citizen of the United States, and resident of Philadelphia, county of Philadelphia, and State of Pennsylvania, have made a certain new and useful Invention Relating to Channel-Bar Automobile-Buffers, of which the following is a specification, taken in connection with the accompanying drawing, which forms part of the same.

This invention relates especially to automobile buffers having angular or channel bumper bars and adjustably connected supporting members which may be conveniently formed of vertically rigid spring steel strip. These supporting members may comprise attaching members to be clamped or otherwise connected to the automobile frame, and outwardly curved resilient portions, and are preferably provided or formed with bent connector portions or loops which may have their strip edges clamped to the bumper bar. These connector loops may be substantially closed and provided with connector apertures, one or more connector bolts preferably extending through each of these connector loops and through connector openings such as holes or slots in a flange of the bumper bar and also through suitable nuts coöperating with the connector loops so as to securely clamp the connector loops of the supporting members to one of the flanges of the bumper bar. In this way also a convenient adjustment can be secured, rendering the buffer laterally adjustable as far as its supporting or attaching members are concerned, so that it can fit automobiles having frame members at different distances apart.

In the accompanying drawing showing in a somewhat diagrammatic way illustrative embodiments of the invention, Figure 1 is a top view partly in section showing one form of buffer.

Fig. 2 is a perspective view on an enlarged scale showing a slightly modified form of a resilient supporting member.

Fig. 3 is a transverse section therethrough and through the coöperating parts of the buffer taken along a line corresponding with 3—3 of Fig. 1; and Fig. 4 is a partial perspective view showing another form of supporting member.

The bumper bar of any desired angular or channel section may as indicated in Fig. 1 have rearwardly curved ends and may comprise the web 1 and flanges 2, 3. A series of connector holes, such as 4, may be formed in one of the flanges adjacent each end of the bumper bar and for most purposes these connector holes are preferably formed in the lower flange so that the connector devices are concealed and protected to a greater extent. Resilient supporting members may with advantage be formed of spring steel strip of considerably greater vertical width than thickness so as to secure the desired vertical rigidity while rendering these supporting members many times more yielding in horizontal directions. The supporting members may comprise the rearwardly extending attaching members 5, 6 to be clamped or otherwise secured to the frame of the automobile or other vehicle. Each of the supporting members is preferably formed with an outwardly curved resilient portion 18 and with a connector loop or portion adapted to be clamped to one of the flanges of the bumper bar. As indicated in Fig. 1 the connector loop may comprise the coöperating bent portions 7, 8 and 9 forming a connector loop of such width as to accommodate the connector bolt 10 and be located and preferably concealed within the flanges of the bumper bar. For some purposes in order to somewhat stiffen this connector loop the end of the supporting member strip 9 may be brought out into substantial contact with the bend or curve 7 therein so as to form a substantially closed connector loop, although this is not, of course, necessary in all cases.

The connector bolt 10 may, of course, be arranged within any of the connector holes 4 adjacent the end of the bumper bar and extend into the connector loop so as to coöperate with a connector nut 11 arranged within the channel or angle iron bumper bar. If desired, a connector aperture, such as 13, may be formed in the connector loop so as to accommodate this connector nut 11 and sufficient play of the nut may be allowed within this connector aperture so as to make possible some adjustment of the connector loop with respect to the bolt in each of the connector holes, as indicated in Fig. 1. When the connector bolt is tightened preferably in connection with a lock washer or other holding device 12, the connector loop or portion is drawn down tightly against the coöperating flange of the bumper bar and a rigid and secure connection is in this way secured between the parts. For some purposes it is desirable to have the nut 11 provided with a contact face 21 which may be wedged or forced into holding engagement with the web 1 of the bumper bar by the action of the bolt and supporting member and thus still more securely hold the parts in this clamped position and minimize movement or loosening thereof. Each of the connector loops or portions may be clamped to the corresponding end of the bumper bar in this way and with such a series of connector holes as are indicated an ample range of adjustment is secured so that the attaching members may be clamped at any distance apart necessary to fit the various widths of automobile frames. By arranging the connector bolts and coöperating devices within the flanges of the channel bumper bar these parts are substantially or practically concealed when the buffer is in place on the automobile and the outwardly curving portions of the supporting members may be arranged to merge into the outlines of the bumper bar so as to give the complete buffer a pleasing outline and appearance.

If desired, the connector portion of the supporting members may be in the form of an open loop as indicated in Fig. 4 comprising the portion 16 as an extension of the outwardly curving portion 17 of the supporting member, the end 14 of this resilient strip being, if desired, bent into parallel position so as to form the open connector loop 15 between them of such size as to accommodate the threaded end of the connector bolt 10 used. A similar connector aperture may be formed in this loop portion as indicated so as to accommodate the connector nut 11 and enable the parts to be rigidly clamped together and firmly secure the connector loop against the lower flange 2 of the bumper bar. If desired a similar adjustment play may be allowed between the nut 11 and the end of the connector aperture 13, so that suitable adjustment is allowed in this way in addition to the adjustment secured by arranging the connector bolt 10 in any one of the different connector holes 4 in the flange 2 of the bumper bar.

This invention has been described in connection with a number of illustrative embodiments, forms, proportions, parts, arrangements, materials, methods of connection and use, to the details of which disclosure the invention is not of course to be limited, since what is claimed as new and what is desired to be secured by Letters Patent is set forth in the appended claims.

I claim—

1. The automobile buffer comprising a channeled bumper bar formed with rearwardly bent end portions and a series of connector holes in the lower flange of said bumper bar, a pair of supporting members formed of strip and each having a rearwardly extending attaching member, a resilient intermediate portion and a connector loop, connector bolts adapted to pass through said connector holes and loops, connector nuts to be engaged by said connector bolts to securely clamp an edge of each of said connector loops against the lower flange of said bumper bar and adjustably connect said supporting members thereto to adjust the lateral position of said attaching members to fit automobiles having frame members at different distances apart.

2. The automobile buffer comprising a buffer front element of channeled section and having a series of connector holes formed in the lower flange of said front element, a pair of supporting members formed of resilient strip and each having a rearwardly extending attaching member and a curved resilient intermediate portion substantially merging adjacent its outer end into the outlines of the flanges of said front element and a loop connector portion having a connector aperture and connector bolts adapted to pass through each of said connector portions and through said connector holes and coöperating with the lower flange of said front element to clamp thereto the lower edges of said supporting members.

3. The automobile buffer comprising a buffer front element of channeled section and having a series of connector holes formed in the lower flange of said front element, a pair of supporting members formed of resilient strip and each having a rearwardly extending attaching member and a curved portion substantially merging adjacent its outer end into the outlines of said front element and a connector portion coöperating with said front element and connector bolts adapted to coöperate with said connector portions and said connector holes and coöperating with the lower flange of said front element to clamp thereto the lower edges of said supporting members.

4. The automobile buffer comprising a buffer front element of channeled section and provided with a series of connector holes in one of its flanges, a pair of supporting members each having a rearwardly extending attaching member and a loop connector portion, connector bolts passing through said connector loops and through said connector holes, and connector nuts arranged in coöperation with said connector portions and engaged by said connector bolts to securely clamp said connector loops against the flange of said connector members and adjustably connect said supporting members thereto to adjust the lateral distance between said attaching members to fit automobiles having frame members at different distances apart.

5. The automobile buffer comprising an angular sectioned bumper bar formed with a series of connector openings in the lower flange of said bumper bar adjacent the ends thereof, a pair of resilient supporting members each having a rearwardly extending attaching member and a substantially closed loop connector portion formed with a connector aperture, connector bolts adapted to pass through each of said connector portions and through said connector holes, connector nuts arranged in said apertures in coöperation with said connector portion to be engaged by said connector bolts and have direct holding engagement with an inner face of said bumper bar to securely clamp said connector loops against said flange of said bumper bar.

6. The automobile buffer comprising an angular sectioned bumper bar formed with a series of connector openings in a flange of said bumper bar adjacent the ends thereof, a pair of resilient supporting members each having a rearwardly extending attaching member and a loop connector portion formed with a connector aperture, connector bolts adapted to pass through said connector portions and through said connector holes, connector nuts arranged in said apertures in coöperation with said connector portions to be engaged by said connector bolts to securely clamp said connector loops against said flange of said bumper bar.

7. The automobile buffer comprising an angular sectioned bumper bar formed with a series of connector openings in a flange of said bumper bar, a pair of resilient supporting members each having a rearwardly extending attaching member and a loop connector portion, connector bolts adapted to pass through said connector portions and through said connector holes, connector nuts arranged in coöperation with said connector portions to be engaged by said connector bolts to securely clamp said connector loops against said flange of said bumper bar.

8. The automobile buffer comprising an angular sectioned bumper bar formed with a series of connector holes in the lower flange of said bumper bar adjacent the ends thereof, a pair of supporting members formed of vertically rigid spring steel strip and each having a rearwardly extending attaching member, an outwardly curved resilient intermediate portion and a loop connector portion formed with a connector aperture, connector bolts adapted to pass through said connector holes and coöperate with said connector portions, connector nuts arranged in said apertures in coöperation with said connector portions to be engaged by said connector bolts and have holding engagement with an inner face of said bumper bar to securely clamp the strip edges of said connector portions against the lower flange of said bumper bar and adjustably connect said supporting members thereto to adjust the lateral position of said attaching members to fit automobiles having frame members at different distances apart.

9. The automobile buffer comprising an angular sectioned bumper bar formed with a series of connector holes in the lower flange of said bumper bar adjacent the ends thereof, a pair of supporting members formed of vertically rigid spring steel strip and each having a rearwardly extending attaching member, a curved resilient intermediate portion and a loop connector portion formed with a connector aperture, connector bolts adapted to pass through said connector holes and coöperate with said connector portions, connector nuts arranged in coöperation with said connector portions to be engaged by said connector bolts to securely clamp the strip edges of said connector portions against the lower flange of said bumper bar and adjustably connect said supporting members thereto to adjust the lateral position of said attaching members to fit automobiles having frame members at different distances apart.

10. The automobile buffer comprising an angular sectioned bumper bar formed with series of connector openings in the lower flange of said bumper bar adjacent the ends thereof, a pair of supporting members formed of vertically rigid spring steel strip and each having an attaching member, a curved resilient intermediate portion and a loop connector portion, connector bolts adapted to pass through said connector openings and coöperate with said connector portions to securely clamp the strip edges of said connector portions against the lower flange of said bumper bar and connect said supporting members thereto.

11. The automobile buffer comprising an angular sectioned bumper bar formed with a series of connector openings in a flange of said bumper bar, a pair of supporting members each having a rearwardly extending attaching member, and a connector portion, connector bolts adapted to pass through said connector portions and through said connector holes, connector nuts arranged in coöperation with said connector portions to be engaged by said connector bolts to securely clamp said connector portions against said flange of said bumper bar.

GEORGE ALBERT LYON.

Witnesses:
HARRY L. DUNCAN,
JESSIE B. KAY.